US008767011B1

(12) United States Patent
Kornmann

(10) Patent No.: US 8,767,011 B1
(45) Date of Patent: Jul. 1, 2014

(54) CULLING NODES OVER A HORIZON USING CONICAL VOLUMES

(75) Inventor: David Kornmann, Tucson, AZ (US)

(73) Assignee: Google Inc., Mountain View, CA (US)

(*) Notice: Subject to any disclaimer, the term of this patent is extended or adjusted under 35 U.S.C. 154(b) by 353 days.

(21) Appl. No.: 13/274,933

(22) Filed: Oct. 17, 2011

(51) Int. Cl.
*G09G 5/00* (2006.01)

(52) U.S. Cl.
USPC .......................................... 345/623; 345/420

(58) Field of Classification Search
CPC ............................... G06T 17/00; G06T 17/005
USPC ................................................ 345/623, 420
See application file for complete search history.

(56) References Cited

U.S. PATENT DOCUMENTS

| 7,746,343 | B1* | 6/2010 | Charaniya et al. ............ 345/428 |
| 2004/0098236 | A1* | 5/2004 | Mayer et al. ....................... 703/2 |
| 2009/0256840 | A1* | 10/2009 | Varadhan et al. .............. 345/419 |
| 2009/0259976 | A1* | 10/2009 | Varadhan et al. .............. 715/850 |
| 2010/0104174 | A1* | 4/2010 | Rohlf et al. .................... 382/154 |
| 2010/0188403 | A1* | 7/2010 | Mejdrich et al. .............. 345/426 |

OTHER PUBLICATIONS

Lindstrom, Peter, et al., "Level-of-Detail Management for Real-Time Rendering of Phototextured Terrain," GVU Technical Report, GIT-GVU-95-06, Georgia Institute of Technology, United States (1995), pp. 1-16.

Liu, L., et al., "An Exploration Strategy for Autonomous Construction of Agricultural Field Maps," Paper No. 06-155S, CSBE/SCGAB 2006 Annual Conference, The Canadian Society for Bioengineering, Canada (2006), pp. 1-15.

Wu, Yadong, et al., "Efficient View-dependent Rendering of Terrains," in *Graphics Interface 2001 (GRIN '01)*, 217-222, Canadial Information Processing Society, Canada (2001).

* cited by examiner

*Primary Examiner* — Maurice L McDowell, Jr.
(74) *Attorney, Agent, or Firm* — Dority & Manning, P.A.

(57) ABSTRACT

An exemplary method includes determining a node having a drawable payload representing a surface portion of a curved three-dimensional model in a three-dimensional environment. The exemplary method also includes determining whether the virtual camera is located within a first substantially conical volume. The exemplary method further includes determining whether the virtual camera is located within a second substantially conical volume. The exemplary method also includes when the virtual camera is determined to be inside the first substantially conical volume and to be outside the second substantially conical volume, culling the node. The exemplary method further includes when the virtual camera is determined to be inside both the first substantially conical volume and the second substantially conical volume, rendering the drawable payload.

20 Claims, 12 Drawing Sheets

CULLING NODES OVER A HORIZON USING CONICAL VOLUMES

BACKGROUND

1. Field

This disclosure relates to geographic information systems (GIS) and in particular to culling nodes for rendering a three-dimensional environment.

2. Background

A geographic information system (GIS) is one type of system that uses a virtual camera to navigate through a three-dimensional environment. A GIS is a system that can be used for storing, retrieving, manipulating, and displaying a substantially spherical three-dimensional model of the Earth. The three-dimensional model may include satellite images texture mapped to terrain, such as mountains, valleys, and canyons. Further, the three-dimensional model may include buildings and other three-dimensional features.

Usability of GIS applications depends on displaying content quickly and smoothly.

BRIEF SUMMARY

This disclosure generally relates to culling nodes for rendering a three-dimensional environment and in particular to culling nodes over a horizon using conical volumes.

An exemplary method for culling nodes for rendering a three-dimensional environment includes determining a node having a drawable payload representing a surface portion of a curved three-dimensional model in the three-dimensional environment. At least a portion of the drawable payload is located within a field of view of a virtual camera in the three-dimensional environment. The virtual camera defines a perspective to view content of the three-dimensional environment. The exemplary method also includes determining whether the virtual camera is located within a first substantially conical volume in the three-dimensional environment. The first substantially conical volume is bounded by a first substantially conical surface that is tangent to respective vertices of the drawable payload in the three-dimensional model. The exemplary method further includes determining whether the virtual camera is located within a second substantially conical volume in the three-dimensional environment. The second substantially conical volume: (i) has an apex located at an origin of the curved three-dimensional model and (ii) is bounded by a second substantially conical surface that intersects with respective vertices of the drawable payload in the three-dimensional model. The exemplary method also includes when the virtual camera is determined to be inside the first substantially conical volume and is determined to be outside the second substantially conical volume, culling the node. Culling the node avoids the rendering of drawable data over a horizon of the curved three-dimensional model from the perspective of the virtual camera. The exemplary method further includes when the virtual camera is determined to be inside both the first substantially conical volume and the second substantially conical volume, rendering the drawable payload.

Another exemplary method for culling nodes for rendering a three-dimensional environment includes determining a node having a drawable payload representing a surface portion of a curved three-dimensional model in the three-dimensional environment. At least a portion of the drawable payload is located within a field of view of a virtual camera in the three-dimensional environment. The virtual camera defines a perspective to view content of the three-dimensional environment. The exemplary method also includes determining first and second elevation points of the drawable payload of the node in the three-dimensional environment. The exemplary method further includes determining third and fourth elevation points of the curved three-dimensional model in the three-dimensional environment. The third and fourth elevation points are located at an elevation such that the drawable payload within a node bounding volume of the node is not visible from the perspective of the virtual camera. The exemplary method also includes determining whether the virtual camera is located within a first substantially conical volume in the three-dimensional environment. The first substantially conical volume is bounded by a first substantially conical surface that intersects with the first and second elevation points and is tangent to the third and fourth elevation points in the three-dimensional environment. The exemplary method further includes determining whether the virtual camera is located within a second substantially conical volume in the three-dimensional environment. The second substantially conical volume: (i) has an apex located at an origin of the curved three-dimensional model and (ii) is bounded by a second substantially conical surface that intersects with the third and fourth elevation points in the three-dimensional environment. The exemplary method also includes when the virtual camera is determined to be inside the first substantially conical volume and is determined to be outside the second substantially conical volume, culling the node. Culling the node may avoid the rendering of drawable data over a horizon of the curved three-dimensional model from the perspective of the virtual camera. The exemplary method further includes when the virtual camera is determined to be inside both the first substantially conical volume and the second substantially conical volume, rendering the drawable payload.

Other embodiments of these aspects include corresponding systems, apparatuses, and computer program products configured to perform the actions of these methods, encoded on computer storage devices.

Further features and advantages of embodiments described herein, as well as the structure and operation of various embodiments, are described in detail below with reference to the accompanying drawings. It is noted that the embodiments described below are not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS/FIGURES

Embodiments are described with reference to the accompanying drawings. The accompanying drawings, which are incorporated herein and form a part of the specification, illustrate embodiments and, together with the description, further serve to explain the principles of the embodiments and to enable a person skilled in the relevant art to make and use the embodiments. In the drawings, like reference numbers may indicate identical or functionally similar elements. The drawing in which an element first appears is generally indicated by the left-most digit in the corresponding reference number.

DETAILED DESCRIPTION

I. Overview
II. Quadtrees
III. Node Culling
  A. Ignore Elevation in Node
  B. Lines of Longitude and Latitude
  C. Consider Elevation in Node
    1. Maximum Elevation of the Node
    2. Maximum-Nonviewable Elevation of the Three-Dimensional Model
    3. Node Culling
  D. Exemplary Method for Processing and Rendering Nodes
IV. Node Culling—Consider Elevation in Node
  A. Exemplary Client Architecture
  B. Exemplary Method
V. Node Culling—Ignore Elevation in Node
  A. Exemplary Renderer Module
  B. Exemplary Method
VI. Conclusion

I. Overview

This description generally relates to culling nodes in a three-dimensional environment. Streaming a three-dimensional model in a three-dimensional environment may include traversing a quadtree (or other data structure) and determining whether a node in the quadtree is visible from a perspective of a virtual camera in the three-dimensional environment. The virtual camera defines a perspective to view content of the three-dimensional environment. To conserve time and computational resources, it is desirable to reject nodes that are not visible from the perspective of the virtual camera. If nodes that are not visible from the perspective of the virtual camera are identified early in a quadtree traversal, then a substantial portion of the quadtree may be eliminated without being traversed.

In an embodiment, two cones are used to determine whether a node is over the horizon and, therefore, should be culled. The cones can be determined with respect to the node and a three-dimensional model in the three-dimensional environment. Determining a virtual camera's location with respect to these cones can identify whether a node is over the horizon from the perspective of the virtual camera. If the node is over the horizon with respect to the virtual camera, the node and its children (if any) can be culled.

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

II. Quadtrees

Data associated with geographic information may be stored in a database characterized by a hierarchical data structure such as a quadtree structure. Quadtrees are composed of nodes and leaves. Nodes are elements which have children node descendants. Leaves, meanwhile, are node elements which have no children. In a quadtree, each parent node has exactly four children descendants.

Figure 1:
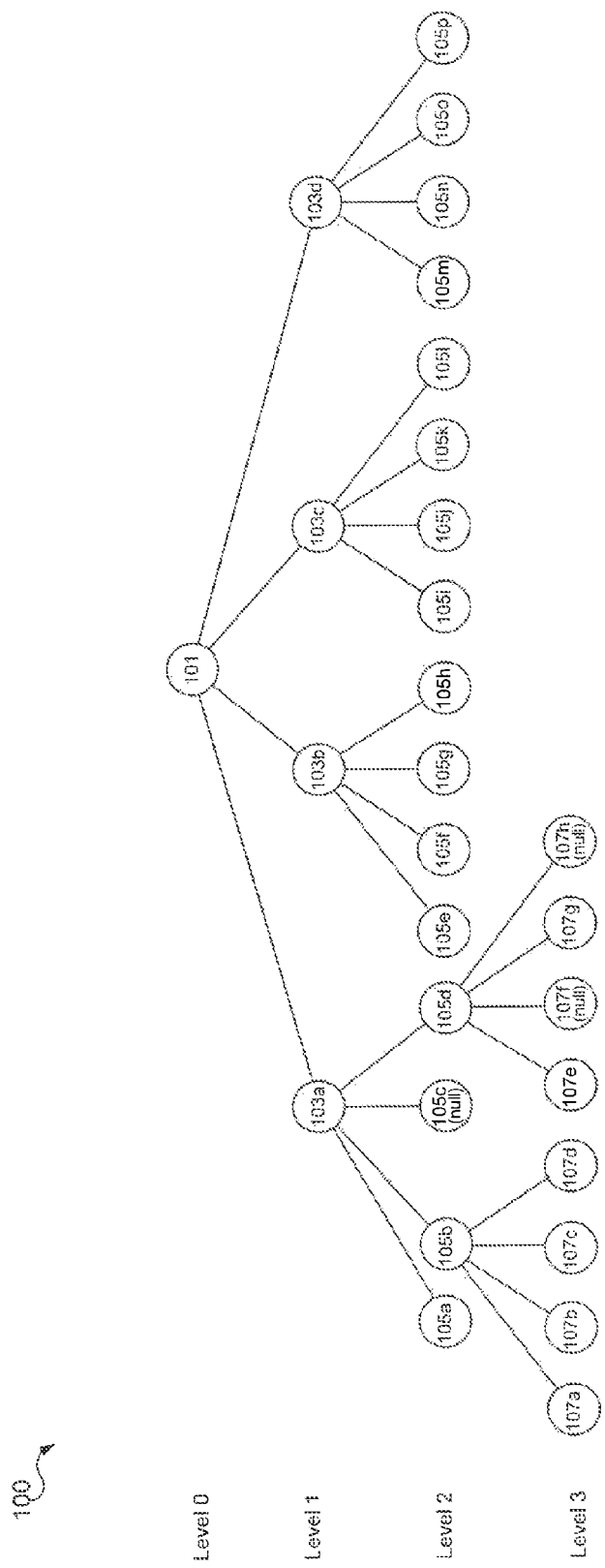
FIG. 1 shows an exemplary quadtree structured as a tree.

FIG. 1 shows an exemplary quadtree structured as a tree. A root node 101 has exactly four children, 103a-103d. Each node at level 1 also has four children, as shown at level 2. Each level of a quadtree possesses four times as many nodes as its previous level. Both nodes and leaves may contain various types of data. The data may be stored in rows of a database. In the quadtree structure, each row of the database may be represented as a node or leaf. Each node may represent a database row for a region of land including an image tile representation of that region. A node may also contain information related to the children of that node.

Searching for data in a particular desired node in a quadtree data structure may first start at the root node of the quadtree. Based on the data in the root node, ancestor nodes of the desired node are determined. Traversing the quadtree may require finding each ancestor node covering the desired node, until the desired node is reached.

A virtual camera defines a perspective to view content of the three-dimensional environment. Once it is determined that a parent node is not visible from the perspective of the virtual camera, it can be assumed that all progeny (if any) of that parent node is also completely not visible from the perspective of the virtual camera. Nodes continue to be downloaded until the children nodes returned contain only payloads that are not visible from a perspective of the virtual camera. Nodes that are over the horizon from the perspective of the virtual camera may be culled. Accordingly, it may become unnecessary to traverse the children nodes, saving computational resources and time.

Quadtrees may be used in conjunction with a two-dimensional map. Such quadtrees may be used to divide a two-dimensional map into four partitions, and sub-divide the created partitions further depending on the data contained in the two-dimensional map. In an embodiment, a quadtree is used to partition a surface of the Earth into subregions. Each sub-region may be bounded by lines of latitude and longitude.

III. Node Culling

A. Ignore Elevation in Node

A space partition on a surface of, for example, the Earth can contain content that has an elevation above the surface. In an embodiment, elevations of a space partition area on the Earth's surface are not used to determine whether to cull a node. An algorithm that determines whether to cull the node may ignore varying elevations in the node. For example, if the node contains a mountain having a particular elevation, the algorithm may ignore the elevations of the mountain in determining whether to cull the node.

Figure 2:
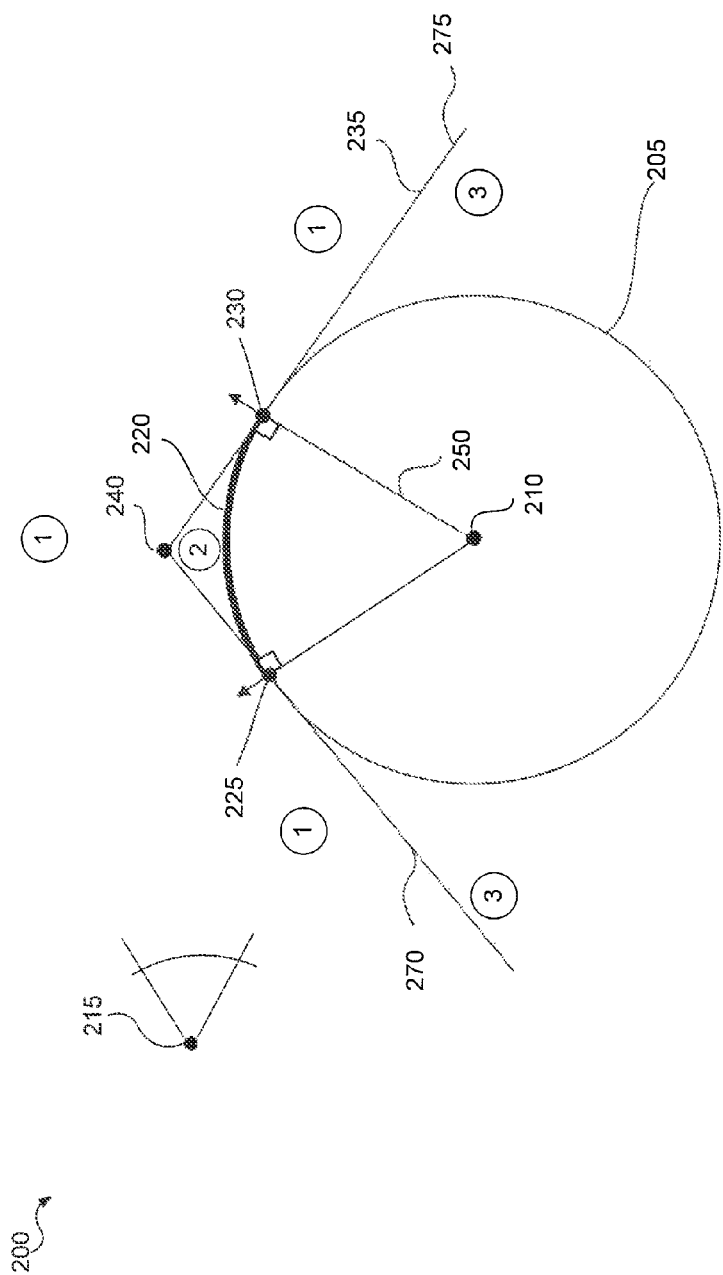
FIG. 2 shows a diagram illustrating node culling that ignores varying elevations in the node, according to an embodiment.

FIG. 2 shows a diagram 200 illustrating node culling that ignores varying elevations in the node, according to an embodiment. Diagram 200 shows a three-dimensional geometry 205. Three-dimensional geometry 205 may be a curved three-dimensional model in the three-dimensional environment. In an embodiment, the curved three-dimensional model has a substantially spherical volume. A substantially spherical volume includes a volume that may not be totally spherical but approximates the shape of a spherical volume. For example, ellipsoids and spheroids have substantially spherical volumes. Further, due to its rotation and other factors, the Earth is not a perfect sphere and has a substantially spherical volume. Three-dimensional geometry 205 may, for example, be a three-dimensional model of the Earth having a center origin at a point 210. Point 210 may be a center of, for example, a three-dimensional model of the Earth.

A virtual camera 215 defines what portion of the three-dimensional model to display to a user in a display area. Virtual camera 215 may define a perspective to view content of the three-dimensional environment. A node 220 may have a drawable payload representing a surface portion of three-dimensional geometry 205. At least a portion of the drawable payload may be located within a field of view of virtual camera 215.

Diagram 200 displays culling nodes using two cones-cone 235 and cone 250. By determining whether virtual camera 215 resides within the respective cones 235 and 250, some embodiments determine whether node 220 is over the horizon from the perspective of virtual camera 215 and, therefore, should not be rendered. Node 220 has vertices 225 and 230. A conical surface of a cone 235 is tangent to vertices 225 and 230 of the drawable payload of node 220 in three-dimensional geometry 205. The conical surface of cone 235 is formed by the union of tangent lines that pass through an apex 240 of cone 235. A ray 270 that extends from apex 240 and passes through vertex 225 is normal to the surface of three-dimensional geometry 205. Similarly, a ray 275 that extends from apex 240 and passes through vertex 230 is normal to the surface of three-dimensional geometry 205. Rays 270 and 275 may extend from apex 240 and beyond the vertices of node 220. A conical volume of cone 235 is bounded by the conical surface of cone 235.

Figure 5:
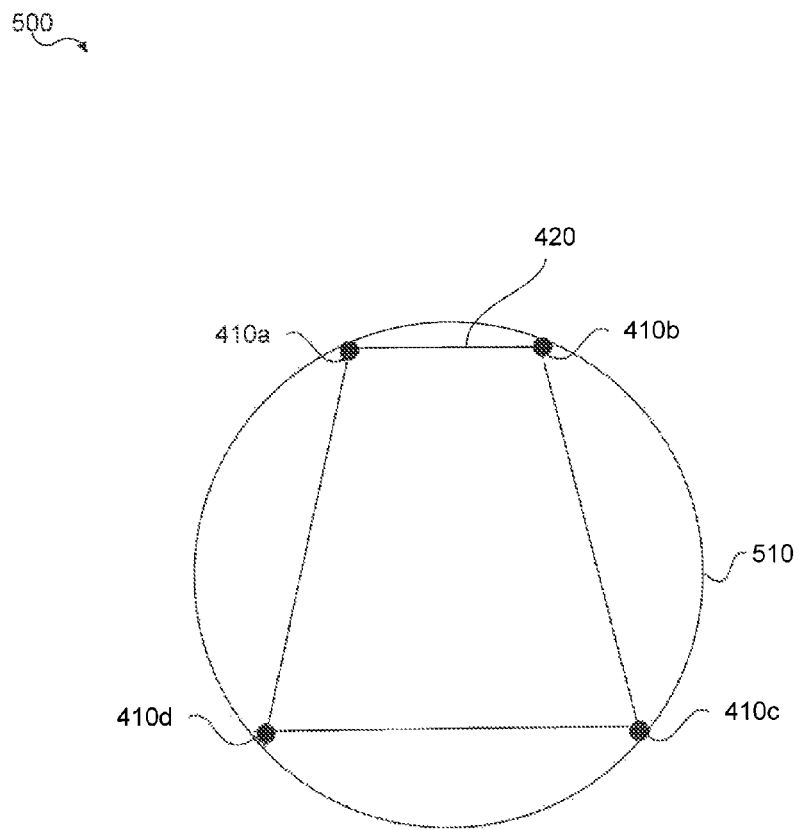
FIG. 5 shows a diagram illustrating vertices of node tangent to a circle line of contact, according to an embodiment.

In contrast to cone 235, conical surface of a cone 250 is not tangent to vertices 225 and 230 of the drawable payload of node 220. Instead of a tangential relationship, the conical surface of cone 250 intersects with vertices 225 and 230. The conical surface of cone 250 is formed by the union of lines that extend point 210 to intersect with a circle specified by the vertices as illustrated in FIG. 5. Point 210 is an apex of cone 250 and is located at an origin of three-dimensional geometry 205. A conical volume of cone 250 is bounded by the conical surface of cone 250.

Cones 235 and 250 can be used to determine whether node 220 is over the horizon from the perspective of the virtual camera. The conical surface of cone 235 can be thought of as a line of sight. In FIG. 2, virtual camera 215 is located above the line of sight (in Zone 1). When virtual camera 215 is in Zone 1, virtual camera 215 is above the tangent to the surface of three-dimensional geometry 205 at vertices 225 and 230. In Zone 1, virtual camera 215 is located outside the conical volume of cone 235. In this case, at least a portion of the drawable payload of node 220 is located before the horizon with respect to virtual camera 215. Accordingly, at least a portion of the drawable payload of node 220 is rendered.

Similarly, if virtual camera 215 were located below the line of sight and within a volume closest to apex 240 (in Zone 2), virtual camera 215 would be located within the conical volume of cone 235 and also within the conical volume of cone 250. In Zone 2, the virtual camera is located between the conical volume of cone 235 and a surface of three-dimensional geometry 205. In this case, the drawable payload of node 220 is located before the horizon with respect to the virtual camera. Accordingly, the drawable payload of node 220 is rendered.

However, if virtual camera 215 were located below the line of sight and within a volume away from apex 240 (in Zone 3), virtual camera 215 would be below the tangent to the surface of three-dimensional geometry 205 at vertices 225 and 230. In Zone 3, the virtual camera is located within the conical volume of cone 235 and outside the conical volume of cone 250. In this case, the drawable payload of node 220 is located over the horizon with respect to the virtual camera. Accordingly, the drawable payload of node 220 is not rendered, and node 220 can be culled. Culling node 220 also eliminates its progeny (if any). In an embodiment, when the virtual camera is in Zone 3 and is located below an altitude of apex 240 of the first substantially conical surface, node 220 is culled.

Culling nodes that are over the horizon with respect to the virtual camera early on may eliminate large portions of the planet without traversing nodes representing those portions. For example, if node 220 were culled and the drawable payload of node 220 were to represent ⅛ of the planet, then ⅛ of the planet can be eliminated as early as, for example, traversing three levels of detail within the quadtree. Progeny of node 220 at levels four, five, and so on, may be discarded early in the quadtree traversal process.

This may be analogous to having a light source such as the sun at apex 240. In this example, the sun shines down on node 220 and beams of sunlight are tangent to the surface of the planet at vertices 225 and 230. If an object is located within a volume of cone 235 and below vertices 225 and 230, the object cannot see any light from the sun and is in a shadow of three-dimensional geometry 205. In this case, node 220 is over the horizon and the object cannot see any content in node 220.

In an embodiment, node 220 has four vertices, and cone 235 is tangent to all four vertices of node 220. Cone 235 may be any type of cone. For example, cone 235 may be a right cone, elliptical cone, circular cone, and oblique cone. Further, a shape may have a substantially conical volume that is bounded by a substantially conical surface. A substantially conical volume includes a volume that may not be totally conical but approximates the shape of a conical volume. Similarly, a substantially conical surface includes a surface that may not be totally conical but approximates the shape of a conical surface. A first substantially conical surface may be tangent to respective vertices of the drawable payload in the three-dimensional model. A second substantially conical surface may intersect with respective vertices of the drawable payload in the three-dimensional model.

B. Lines of Longitude and Latitude

Figure 3:
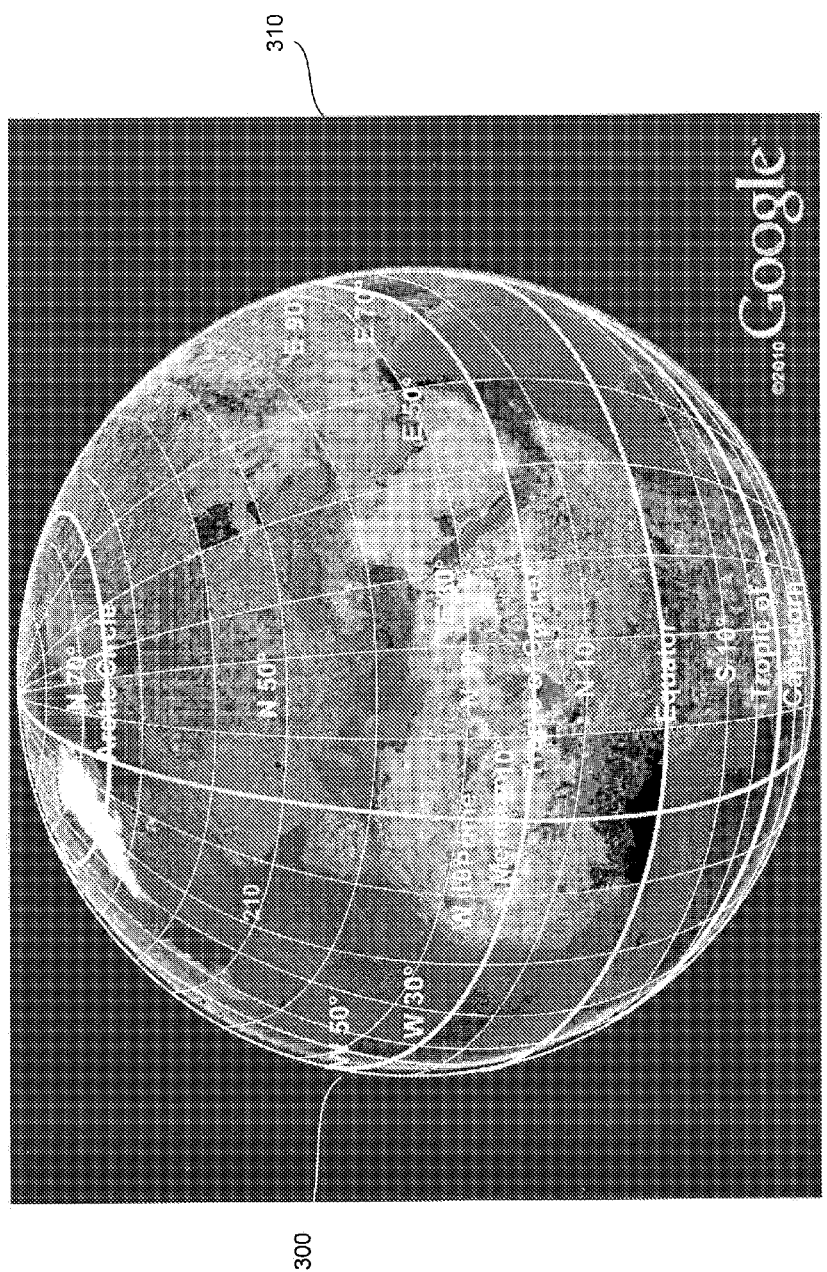
FIG. 3 shows a three-dimensional model of the Earth in a display area, according to an embodiment.

FIG. 3 shows a three-dimensional model of the Earth 300 in a display area 310, according to an embodiment. The data displayed in display area 310 may be from the perspective of a virtual camera. In an embodiment, the perspective is defined by a frustum such as, for example, a three-dimensional pyramid with the top spliced off The frustum has minimum and maximum view distances that can change depending on the viewing circumstances. As a user's view of a three-dimensional map is manipulated, for example, using a graphical user interface, the orientation and position of the frustum changes with respect to the three-dimensional map. Geographic data within the frustum can be displayed at varying levels of detail depending on its distance from the virtual camera. Example geographic data displayed in display area 310 include images of the Earth. These images can be rendered onto a geometry representing the Earth's terrain creating a three-dimensional model of the Earth. Other data that may be displayed include three-dimensional models of buildings, trees, and roads.

Display area 310 shows a grid of latitudinal and longitudinal lines. Lines of latitude are shown as horizontal lines. Latitude is the angular distance, in degrees, minutes, and seconds of a point north or south of the Equator. Lines of latitude may also be referred to as parallels. Lines of longitude are shown as vertical lines. Longitude is the angular distance, in degrees, minutes, and seconds of a point east or west of the Prime (Greenwich) Meridian. Lines of longitude may also be referred to as meridians.

In an embodiment, the lines of latitude and longitude are subdivisions of quadtrees. For example, the Prime Meridian and the Equator can be a first subdivision of a quadtree and this initial quadtree can be one tile. An intersection of lines of latitude and longitude results in a quadrilateral shape on the surface of the Earth. The quadrilateral shape can be a tile, which can be further subdivided. Each time a tile is subdivided, the quadtree is traversed one more level.

The grid lines displayed converge towards the poles, and the quadtree boundaries are compressed towards the poles. A tile formed by the lines of latitude and longitude along a surface of the Earth can have various sizes and shapes as the tiles are closer to the poles. When a location of the virtual camera is closer to the Equator, less grid lines are shown compared to when the location of the virtual camera is closer to the poles.

An increasing number of nodes in a quadtree are concentrated towards the poles. Because of the longitudinal compression, it may be more complicated to traverse nodes closer to the poles because a greater number of nodes are present at the poles. For example, to view these nodes the quadtree is traversed deeper, compared to nodes closer to the Equator, to view the same geographic surface area and obtain the same level of detail. For example, if N and M are both positive numbers, when the virtual camera is closer to the Equator compared to the poles, the quadtree may be traversed N number of levels to view nodes that cover a particular geographic area. When the location of the virtual camera is closer to the poles, the quadtree may be traversed N+M number of levels to view nodes that cover the same geographic area.

To eliminate portions of the quadtree, it is useful to identify nodes that are over a horizon with respect to a virtual camera and cull these nodes. This may be particularly useful, when the virtual camera is located at a high altitude above a surface of the Earth. Culling nodes early saves time and computational resources.

Figure 4:
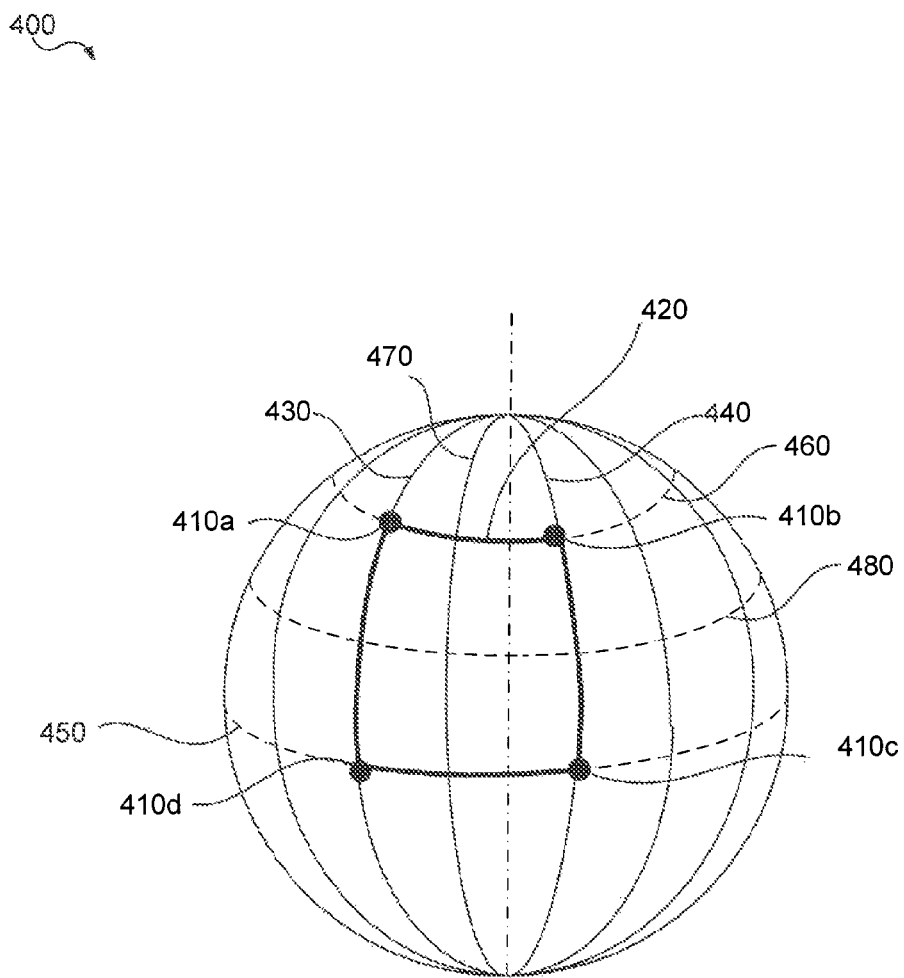
FIG. 4 shows a diagram illustrating vertices of a node in a substantially spherical three-dimensional model of the Earth.

FIG. 4 shows a diagram 400 illustrating vertices 410a-d of node 420 in a substantially spherical three-dimensional model of the Earth. In an embodiment, each quadrilateral (e.g., square, rectangle, and trapezoid) formed by an intersection of lines of latitude and longitude is a quadtree node. For example, node 420 is a quadtree node that is bounded by an intersection of longitude lines 430 and 440 and latitude lines 450 and 460. Node 420 can be further subdivided into four children, for example, along longitude line 470 and latitude line 480.

FIG. 5 shows a diagram 500 illustrating vertices of node 420 tangent to a circle line of contact 510, according to an embodiment. A first cone, for example cone 250 in FIG. 2, may be determined such that it insects each point of circle line of contact 510 and has an apex at the center origin of a three-dimensional model. A second cone, for example cone 235 in FIG. 2, may be determined to be tangent to the spherical three-dimensional model at each point in circle line of contact 510. In this way, circle line of contact 510 together with the three-dimensional model may be used to determine the two cones used in node culling as illustrated in FIG. 2.

C. Consider Elevation in Node

Variations in elevation may affect whether a node is over the horizon with respect to a particular perspective. Further embodiments described in the section describe taking into account relative elevation in determining whether to cull a node. Specifically, in an embodiment, an elevation of a space partition area on the surface of three-dimensional geometry 605 is taken into consideration in determining whether to cull a node. An algorithm that determines whether to cull the node may take into account variations of elevation across a node. Elevation data may represent a height field of the elevation above sea level. Such data may be stored, for example, in a database.

Figure 6:
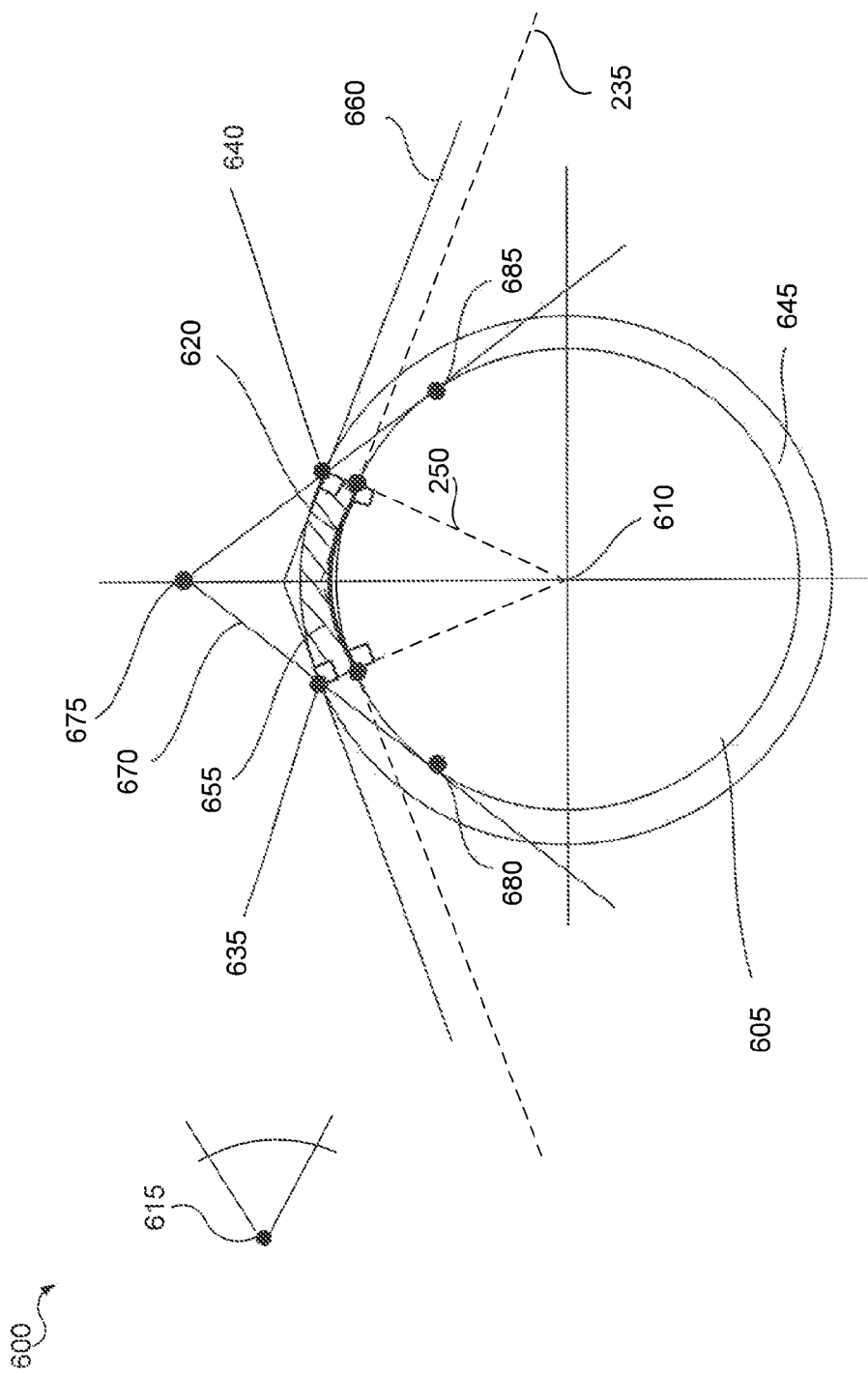
FIG. 6 shows a diagram illustrating culling a node that includes varying elevations in the node, according to an embodiment.

FIG. 6 shows a diagram illustrating culling a node that includes varying elevations in the node, according to an embodiment. A geographic coverage of a node 620 may contain elevation data. For example, node 620 may contain objects such as buildings, cloud layers, and mountains. The elevation of each point or an area surrounding each point may be stored in quadtree nodes stored in a database.

Diagram 600 displays a cone 670 that can be used to cull nodes and different elevation points that can be used to determine cone 670. A first cone (e.g., cone 670) may be computed such that the first cone intersects with points that are located at a maximum elevation of node 620 and is tangent to points that are located at a maximum-nonviewable elevation of a three-dimensional model. More details on the maximum-nonviewable elevation of the three-dimensional model are below. A second cone (e.g., cone 710 in FIG. 7) may be computed such that a surface of the second cone intersects a surface of the first cone at the maximum-nonviewable elevation of the three-dimensional model.

1. Maximum Elevation of the Node

A node may have a maximum elevation that can be used to determine a bounding volume for that node. In an embodiment, a node's maximum elevation is the highest content that is within the node's geographic coverage. Points 635 and 640 represent the highest elevation points within node 620. For example, if node 620 contains mountains, then the maximum elevation of node 620 is the highest mountain. In this example, points 635 and 640 are located at an elevation of the highest peak of the highest mountain.

If node 620 is beyond a horizon from a perspective of the virtual camera, a portion of the drawable payload of node 620 may still be visible. For example, if node 620 contains a huge mountain, it might be beyond a horizon but a top of the mountain may still be above the horizon and viewable. In this example, ground features of node 620 may not be visible but a peak of the mountain may be visible. If a highest point within node 620 (e.g., points 635 and 640) is not visible from a perspective of a virtual camera, then no content in node 620 is visible from the perspective of the virtual camera. Accordingly, content within node 620 is over the horizon from the perspective of the virtual camera, and node 620 can be culled.

Node 620 has maximum elevation points located at points 635 and 640. A conical surface of a cone 660 is tangent to points 635 and 640. The conical surface of cone 660 is formed by the union of tangent lines that pass through an apex of cone 660. A ray that extends from an apex of cone 660 is normal to a surface of three-dimensional model 605 at point 635. Similarly, a ray that extends from an apex of cone 660 is normal to a surface of three-dimensional model 605 at point 640. A conical volume of cone 660 is bounded by the conical surface of cone 660. In an embodiment, if a high bounding volume of node 620 can be determined, cone 660 is computed by extrapolating points from cone 235.

A spherical bounding volume 645 intersects the maximum elevation points located at points 635 and 640. Spherical bounding volume 645 surrounds three-dimensional geometry 605 and represents a bounding volume on a surface of three-dimensional geometry 605. A spherical volume of spherical bounding volume 645 is bounded by a substantially spherical surface. A substantially spherical surface is a surface that is not totally spherical in shape but approximates the shape of a spherical surface. For example, a golf ball having curved dimples on the surface of a golf ball has a substantially spherical surface. Further, in an embodiment, the bounding volume that intersects the maximum elevation points located at points 635 and 640 and surrounds three-dimensional geometry 605 is a substantially spherical volume.

In an embodiment, a shape of the surface of spherical bounding volume 645 has substantially the same shape as the surface of three-dimensional geometry 605. The surface shape of spherical bounding volume 645 does not have to be exactly the same surface shape as three-dimensional geometry 605. In an embodiment, the surface shape of spherical bounding volume 645 is similar to the surface shape of three-dimensional geometry 605.

Within spherical bounding volume 645 is a node bounding volume 655. Node bounding volume 655 represents the bounding volume of the geographic coverage of node 620. Node bounding volume 655 is the volume bounded by node 620 and a surface of spherical bounding volume 645 between a first line segment that extends from point 610 to point 635 and a second line segment that extends from point 610 to point 640.

If spherical bounding volume 645 were fully opaque, cone 660 could be used to determine whether to cull node 620.

If spherical bounding volume 645, however, is transparent a line of sight goes through bounding volume 645 and node 620 in addition to other nodes. For example, the atmosphere is translucent and a line of sight may go through the node bounding volumes of nodes between the virtual camera and node 620. In this example, the atmosphere of the nodes between the virtual camera and node 620 are translucent and may not occlude content of node 620. Because spherical bounding volume 645 is transparent, node 620 may still be visible from the perspective of the virtual camera even if a number of nodes are located between the virtual camera and node 620. If cone 660 were used to determine whether to cull node 620, it may be incorrectly determined that node 620 is not visible with respect to the virtual camera when it actually is visible. Accordingly, using cone 660 for node culling may have unintended consequences such as inaccurately culling nodes.

Another cone (e.g., cone 670) may be used to accurately cull nodes when content within spherical bounding volume 645 is translucent.

2. Maximum-Nonviewable Elevation of the Three-Dimensional Model

A maximum-nonviewable elevation of three-dimensional model 605 may be determined such that at the maximum-nonviewable elevation, no content within node bounding volume 655 is visible from the perspective of the virtual camera. Such an elevation may be used to determine cone 670

In FIG. 6, elevation points 680 and 685 are located at an elevation of three-dimensional model 605 such that if a virtual camera were located at elevation points 680 or 685, or at an elevation lower than these points, no content within node bounding volume 655 of node 620 would be visible. An elevation located at points 680 and 685 may be referred to as a maximum-nonviewable elevation of three-dimensional model 605 because it is located at an elevation of three-dimensional model 605 guaranteeing that no content within the geographic coverage of node 620 is visible at that elevation. The maximum-nonviewable elevation of the three-dimensional model may be a maximum distance from origin 610 to points 680 or 685 that can be tested against to guarantee that content within node bounding volume 655 is not visible.

In an embodiment, points 680 and 685 are located at an elevation of the surface of the Earth that guarantees that if a virtual camera were located at points 680 or 685, the drawable payload of node 620 would not be visible from the perspective of the virtual camera. In one example, three-dimensional geometry 605 is the Earth and the maximum-nonviewable elevation of the Earth is the deepest place on Earth (e.g., Mariana Trench). In this example, the lowest depth of the Mariana Trench is tangent to three-dimensional geometry 605 at points 680 and 685. A round ball of the planet can be carved by eliminating content that is above the Mariana Trench.

The maximum elevation of node 620 can be, for example, Mount Everest. In this example, a surface of spherical bounding volume 645 is tangent to the peak of Mount Everest. If the Mariana Trench and Mount Everest were within the same horizon and a location of the virtual camera were located below the horizon of the Mariana Trench, Mount Everest would not be visible. Node bounding volume 655 represents the bounding volume of content (e.g., Mount Everest and cloud layers) within the node. In this example, Radius of three-dimensional geometry 605=Radius of Earth−Depth of the Mariana Trench.

This example is meant to be nonlimiting. A maximum-nonviewable elevation point of three-dimensional geometry 605 may be any elevation point that is deep enough such that if the virtual camera were located at the maximum-nonviewable elevation point, content within node bounding volume 655 would not be visible from the perspective of the virtual camera. This may take into account a certain roundness of the Earth and elevation over a particular geographic area. Accordingly, a point that is much closer to the surface of the Earth than the Mariana Trench may be used.

3. Node Culling

Figure 7:
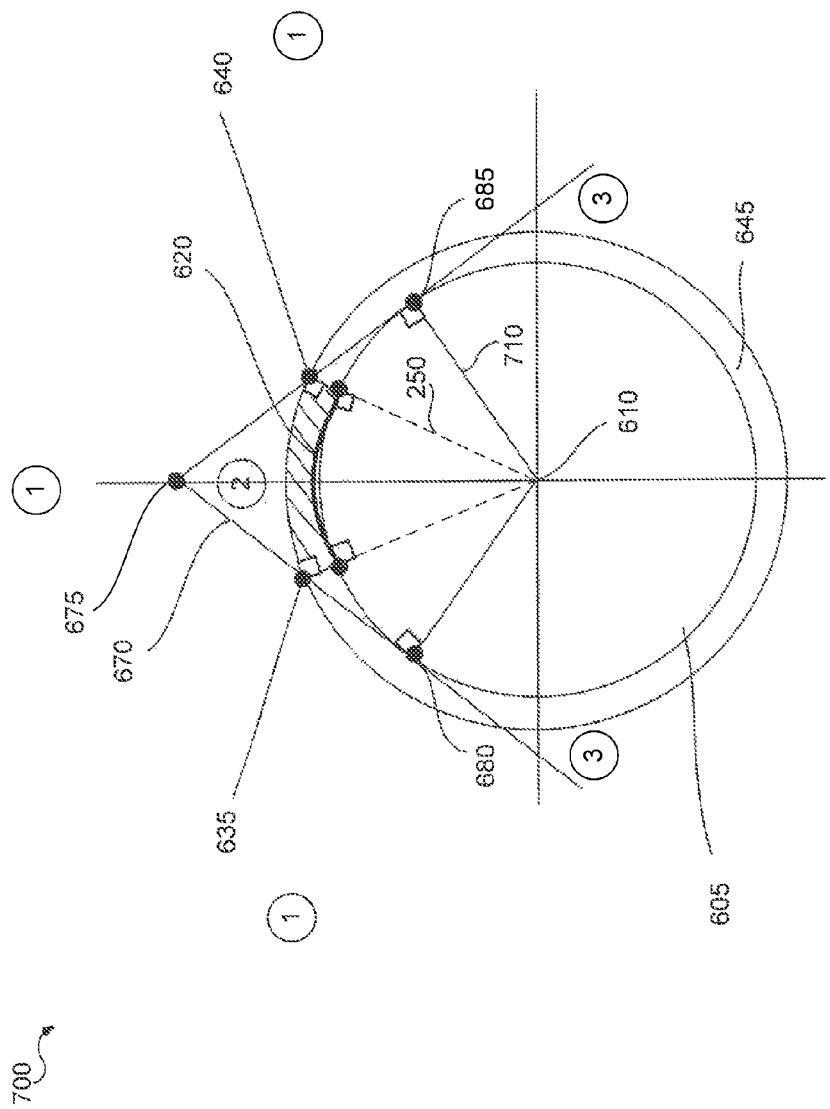
FIG. 7 shows another diagram illustrating culling a node that includes varying elevations in the node, according to an embodiment.

FIG. 7 shows a diagram illustrating culling a node that includes varying elevations in the node, according to an embodiment. Diagram 700 displays culling nodes using two cones-cone 670 and cone 710. By determining whether virtual camera 615 resides within the respective cones 670 and 710, some embodiments determine whether content within node bounding volume 655 is visible from the perspective of virtual camera 615. In an embodiment, if content within node bounding volume 655 of node 620 is not visible from the perspective of virtual camera 615, the drawable payload of node 620 is not rendered.

As described above, cone 670 may be used to determine whether to cull node 620. A conical surface of cone 670 intersects with points 635 and 640 at the maximum elevation points of node 620. The conical surface of cone 670 is tangent to three-dimensional model 605 at maximum-nonviewable points 680 and 685. A ray that extends from apex 675 and passes through point 680 is normal to the surface of three-dimensional geometry 605. Similarly, a ray that extends from apex 675 and passes through point 685 is normal to the surface of three-dimensional geometry 605. A conical volume of cone 670 is bounded by the conical surface of cone 670. The radius of three-dimensional geometry 605 corresponds to a depth of three-dimensional geometry 605 in which content within node bounding volume 655 is not visible. As described, if points 635 and 640 are not visible from an elevation at point 680 or 685, no content inside node bounding volume 655 is visible from the perspective of the virtual camera. Cone 670 may represent a generalization that takes into account the volume represented by content on the planet.

In contrast to cone 670, conical surface of a cone 710 is not tangent to points 680 and 685. Instead of a tangential relationship, the conical surface of cone 710 intersects with points 680 and 685 of three-dimensional geometry 605. The conical surface of cone 710 is formed by the union of lines intersecting with a circle determined from points 680 and 685 that pass through point 610. Point 610 is an apex of cone 710 and is located at an origin of three-dimensional geometry 605. A conical volume of cone 710 is bounded by the conical surface of cone 710. Cone 710 intersects with cone 670 at least at points 680 and 685.

Cones 670 and 710 may be used to determine whether node 620 is over the horizon from the perspective of the virtual camera. For example, a conical surface of cone 670 can be thought of as a horizon. In FIG. 7, virtual camera 615 is located outside the conical volume of cone 670 (in Zone 1) and above the conical surface of cone 670. When virtual camera 615 is located in Zone 1, virtual camera 615 is above the tangent to the surface of three-dimensional geometry 605 at points 635 and 640 and points 680 and 685. In Zone 1, virtual camera 615 is located outside the conical volume of cone 710. In this case, at least a portion of the drawable payload of node 620 is located before the horizon with respect to virtual camera 615. Accordingly, at least a portion of the drawable payload of node 620 is rendered.

Similarly, if virtual camera 615 were located within the conical volume of cone 670 and within the conical volume of cone 710 (in Zone 2), the drawable payload of node 620 would be located before the horizon with respect to the virtual camera. Accordingly, the drawable payload of node 620 is rendered.

However, if virtual camera 615 were located within the conical volume of cone 670 and outside the conical volume of cone 710 (in Zone 3), the drawable payload of node 620 would be located over the horizon with respect to the virtual camera. Accordingly, the drawable payload of node 620 is not rendered, and node 620 can be culled.

D. Exemplary Method for Processing and Rendering Nodes

Figure 8:
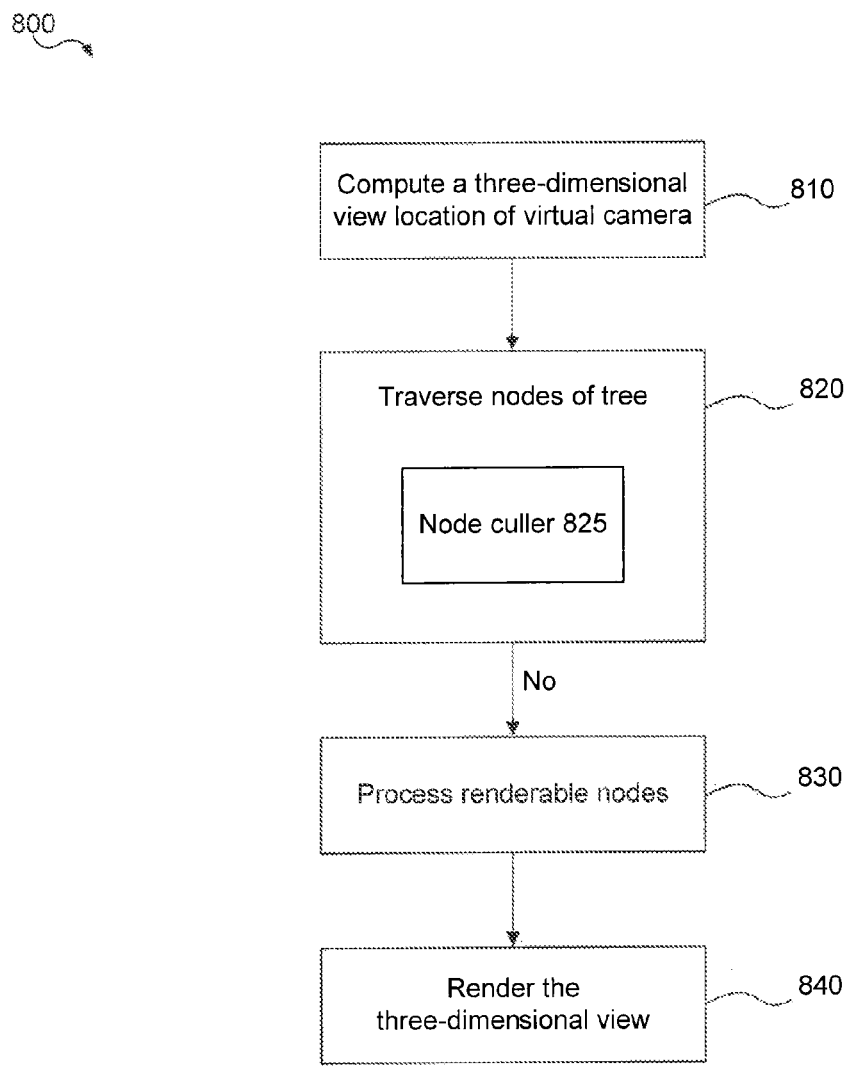
FIG. 8 shows a flowchart of an exemplary method for processing nodes, according to an embodiment.

FIG. 8 shows a flowchart 800 of an exemplary method for processing nodes, according to an embodiment. At step 810, a three-dimensional view location of a virtual camera is computed. This may include computing a location and orientation of the virtual camera. The virtual camera defines a perspective to view content of the three-dimensional environment.

At step 820, nodes of a tree are traversed. A database quadtree traversal may be performed based on a location of the virtual camera. Node culler 825 may determine whether to traverse children nodes of a parent node based on various factors. These factors may include, for example, whether a sufficient level of detail has been reached, whether the drawable payload of the node is located before the horizon with respect to the virtual camera, and whether information for neighboring nodes is determined to be needed in the near future.

If the parent node is located before the horizon with respect to the virtual camera, the parent node may be placed on a list of renderable elements. In an embodiment, the list includes nodes having drawable payload data that are located before the horizon with respect to the virtual camera. If children nodes of the parent node are traversed, the quadtree will be traversed at a deeper level than the current level. If the parent node is located over the horizon with respect to the virtual camera, node culler 825 culls the parent node and discards its progeny.

If node culler 825 culls a node that is in a list of renderable elements, node culler 825 removes the node from the list of renderable elements. If node culler 825 culls a node that is not in the list of renderable elements, the node is not placed on the list of renderable elements. Accordingly, the culled node will not be rendered.

At step 830, renderable elements of the tree are processed. Renderable elements are created based on the list and may be content within a node. The content can be, for example, pieces of terrain, sky, trees, buildings, ground overlays, and airplanes.

At step 840, the three-dimensional view is rendered. In an embodiment, the renderable elements are rendered to a display device.

IV. Node Culling—Consider Elevation in Node

A. Exemplary Client Architecture

Figure 9:
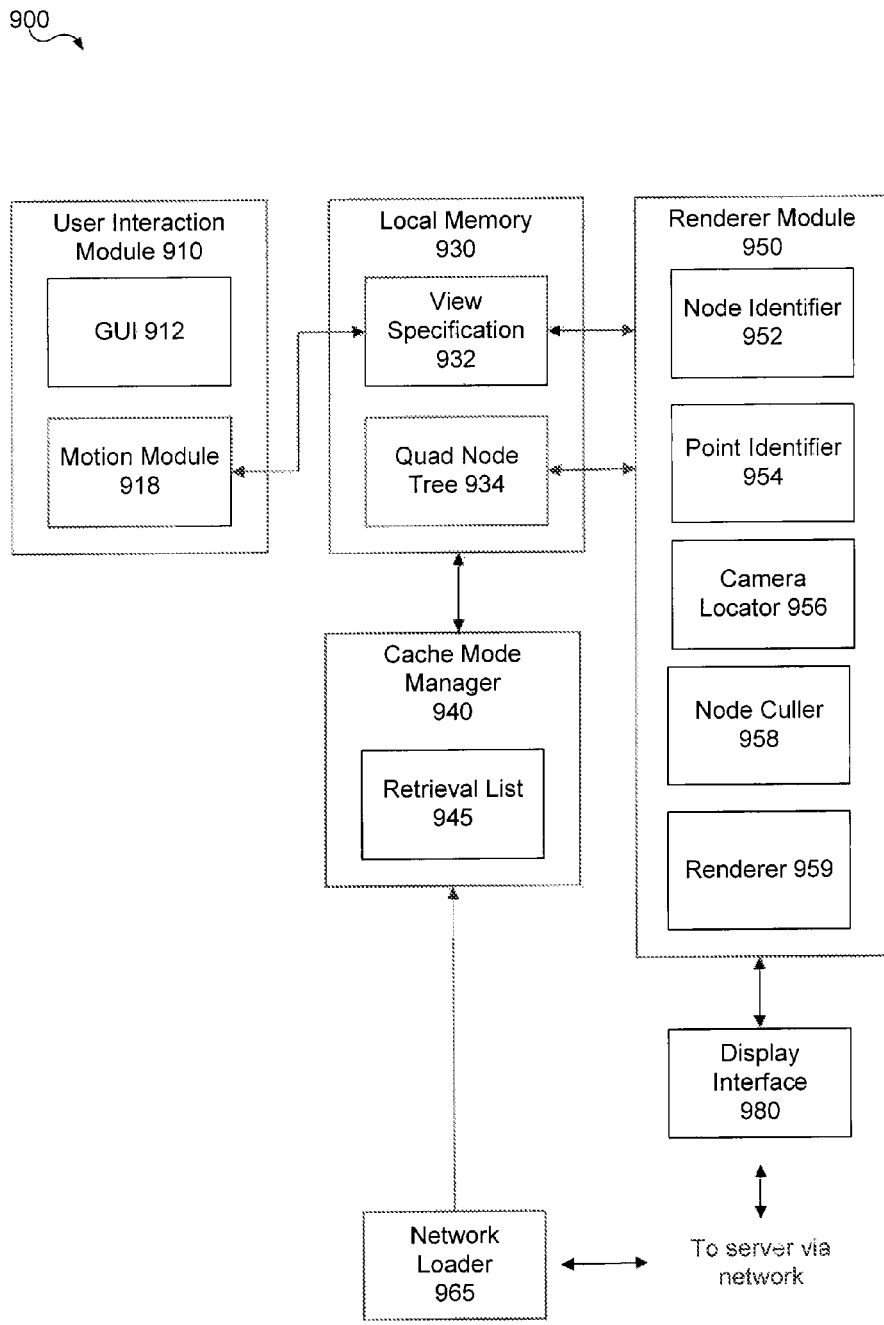
FIG. 9 shows an architecture diagram of an exemplary client of a GIS, according to an embodiment.

FIG. 9 shows an architecture diagram of an exemplary client 900 of a GIS, according to an embodiment. In an embodiment, client 900 includes a user interaction module 910, local memory 930, cache node manager 940, renderer module 950, network loader 965, and display interface 980.

In an embodiment, the components of client 900 can be implemented, for example, as software running on a client machine. Client 900 interacts with a GIS server (not shown) to bring images of the Earth and other geospatial data to client 900 for viewing by a user. Together, the images of the Earth and other geospatial data form a three-dimensional model in a three-dimensional environment. In an embodiment, software objects are grouped according to functions that can run asynchronously (e.g., time independently) from one another.

A user interaction module 910 includes a graphical user interface (GUI) 912 and motion module 918. A local memory 930 includes a view specification 932 and quad node tree 934. Cache node manager 940 includes a retrieval list 945.

In general, client 900 operates as follows. User interaction module 910 receives user input regarding a location that a user desires to view and, through motion module 918, constructs view specification 932. A renderer module 950 uses view specification 932 to decide what data is to be drawn and draws the data. Cache node manager 940 runs in an asynchronous thread of control and builds quad node tree 934 by populating it with quad nodes retrieved from a remote server via a network.

In an embodiment of user interface module 910, a user inputs location information using GUI 912. This results, for example, in the generation of view specification 932.

Motion module 918 uses location information received via GUI 912 to adjust the position or orientation of a virtual camera. The camera is used, for example, for viewing a displayed three-dimensional model of the Earth. A user sees a displayed three-dimensional model on his or her computer monitor from the standpoint of the virtual camera. In an embodiment, motion module 918 also determines view specification 932 based on the position of the virtual camera, the orientation of the virtual camera, and the horizontal and vertical fields of view of the virtual camera.

View specification 932 defines the virtual camera's viewable volume within a three-dimensional space, known as a frustum, and the position and orientation of the frustum with respect, for example, to a three-dimensional map. In an embodiment, the frustum is in the shape of a truncated pyramid. The frustum has minimum and maximum view distances that can change depending on the viewing circumstances. As a user's view of a three-dimensional map is manipulated using GUI 912, the orientation and position of the frustum changes with respect to the three-dimensional map. Thus, as user input is received, view specification 932 changes. View specification 932 is placed in local memory 930, where it is used by renderer module 950.

In an embodiment, renderer module 950 reads view specification 932 that has been placed by motion module 918 in a data structure accessed by a renderer. Renderer module 950 traverses quad node tree 934 in local memory 930 by attempting to access each quad node resident in quad node tree 934. Each quad node is a data structure that has up to four references and an optional payload of data. Once renderer module 950 determines that a parent quad node is completely disjoint from view specification 932, it can be assumed that all progeny of that quad node are also completely disjoint from view specification 932. If the drawable payload of a node is disjoint from the view specification, the node can be culled.

In an embodiment, renderer module 950 culls nodes and takes into account varying elevations in the nodes. Renderer module 950 uses several sub-modules to cull a node. The sub-modules include a node identifier 952, point identifier 954, camera locator 956, node culler 958, and renderer 959.

Node identifier 952 determines a node having a drawable payload representing a surface portion of a curved three-dimensional model in a three-dimensional environment. At least a portion of the drawable payload is located within a field of view of a virtual camera in the three-dimensional environment. The virtual camera defines a perspective to view content of the three-dimensional environment. The drawable payload of the node may have varying elevation levels. For example, the node may include objects such as terrain, cloud layers, and buildings.

Point identifier 954 determines first and second elevation points of the drawable payload of the node in the three-dimensional environment. The first and second elevation points may be located at a highest elevation within content of the node. For example, if a node contains buildings, the maximum elevation of the node may be a height of the tallest building.

Point identifier 954 also determines third and fourth elevation points of the curved three-dimensional model in the three-dimensional environment. The third and fourth elevation points are located at an elevation of the curved three-dimensional model such that the drawable payload within the node bounding volume of the node is not visible with respect to the virtual camera. The third and fourth elevation points are located at a lower elevation than the first and second elevation points. When a virtual camera is located at the third and fourth elevation points, content of the node (e.g., the first and second elevation points) is not visible with respect to the virtual camera.

Camera locator 956 determines whether the virtual camera is located within a first substantially conical volume in the three-dimensional environment. The first substantially conical volume is bounded by a first substantially conical surface that intersects with the first and second elevation points and is tangent to the third and fourth elevation points of the three-dimensional model.

Camera locator 956 also determines whether the virtual camera is located within a second substantially conical volume in the three-dimensional environment. The second substantially conical volume: (i) has an apex located at an origin of the curved three-dimensional model and (ii) is bounded by a second substantially conical surface that intersects with the third and fourth elevation points in the three-dimensional environment.

Quad nodes are configured so that those with drawable payloads may include within their payload a bounding box or other location identifier. Node culler 958 compares the bounding box/location identifier of the quad node payload (if present) with view specification 932. If the bounding box is completely disjoint from view specification 932, the payload of drawable data will not be drawn, even though it was already retrieved from a GIS server and stored on the user's computer. Otherwise, the drawable data is drawn.

Node culler 958 determines whether or not the bounding box (if any) of the quad node payload is completely disjoint from view specification 932 before children of that node are traversed. If the bounding box of the quad node is completely disjoint from view specification 932, the children of that quad node are not accessed. A child quad node never extends beyond the bounding box of its parent quad node.

If appropriate, node culler 958 culls the node. For example, when the virtual camera is determined to be inside the first substantially conical volume and is determined to be outside the second substantially conical volume, node culler 958 culls the node. Node culler 958 may cull the node when the virtual camera is located below an altitude of an apex of the first substantially conical surface. Culling the node avoids the rendering of drawable data over a horizon of the curved three-dimensional model from the perspective of the virtual camera.

If node culler 958 culls a node that is in a list of renderable elements, node culler 958 removes the node from the list of renderable elements. If node culler 958 culls a node that is not in the list of renderable elements, the node is not placed on the list of renderable elements. Accordingly, the culled node will not be rendered.

If appropriate, renderer 959 renders the drawable payload. For example, when the virtual camera is determined to be inside both the first substantially conical volume and the second substantially conical volume, renderer 959 renders the drawable payload. Renderer 959 may render the drawable payload when the virtual camera is located between an altitude of an apex of the first substantially conical surface and a surface of the curved three-dimensional model.

Renderer 959 may consider whether the drawable payload is inappropriate to draw based on other factors. These other factors may include, for example, distance from the camera, whether a sufficient level of detail has been reached, or other such considerations.

As previously explained, a quad node is a data structure that may have a payload of data and up to four references to other files, each of which in turn may be a quad node. The files referenced by a quad node are referred to herein as the children of that quad node, and the referencing quad node is referred to herein as the parent. In some cases, a file contains not only the referenced child, but descendants of that child as well. These aggregates are known as cache nodes and may include several quad nodes. Such aggregation takes place in the course of database construction. In some instances, the payload of data is empty. Each of the references to other files includes, for instance, a filename and a corresponding address in local memory for that file, if any.

The cache node manager 940 thread builds quad node tree 934 in local memory 930 by populating it with quad nodes retrieved from GIS server(s). Retrieval list 945 includes a list of information identifying cache nodes to be downloaded from a GIS server. In each network loader 965 thread, a network loader traverses cache node retrieval list 945 (which in the embodiment shown in FIG. 9 is included in cache node manager 940, but can also be located in other places, such as the local memory 930 or other storage facility) and requests the next cache node from the GIS server(s) using the cache node's filename.

Separately and asynchronously in renderer module 950, upon its next traversal of quad node tree 934 and traversal of the updated parent quad node, renderer module 950 finds the address in local memory corresponding to the child quad node and can access the child quad node. The renderer's traversal of the child quad node progresses according to the same steps that are followed for the parent quad node. This continues through quad node tree 934 until a node is reached that is completely disjoint from view specification 932 or is considered inappropriate to draw based on other factors as previously explained. In an embodiment, cache nodes and thereby quad nodes continue to be downloaded until the children returned contain only payloads that are completely disjoint from view specification 932 or are otherwise unsuitable for drawing, as previously explained.

Display interface 980 (e.g., a display interface card) is configured to allow data from a mapping module to be sent to a display associated with the user's computer, so that the user can view the data. Display interface 980 can be implemented with conventional technology.

B. Exemplary Method

Figure 10:
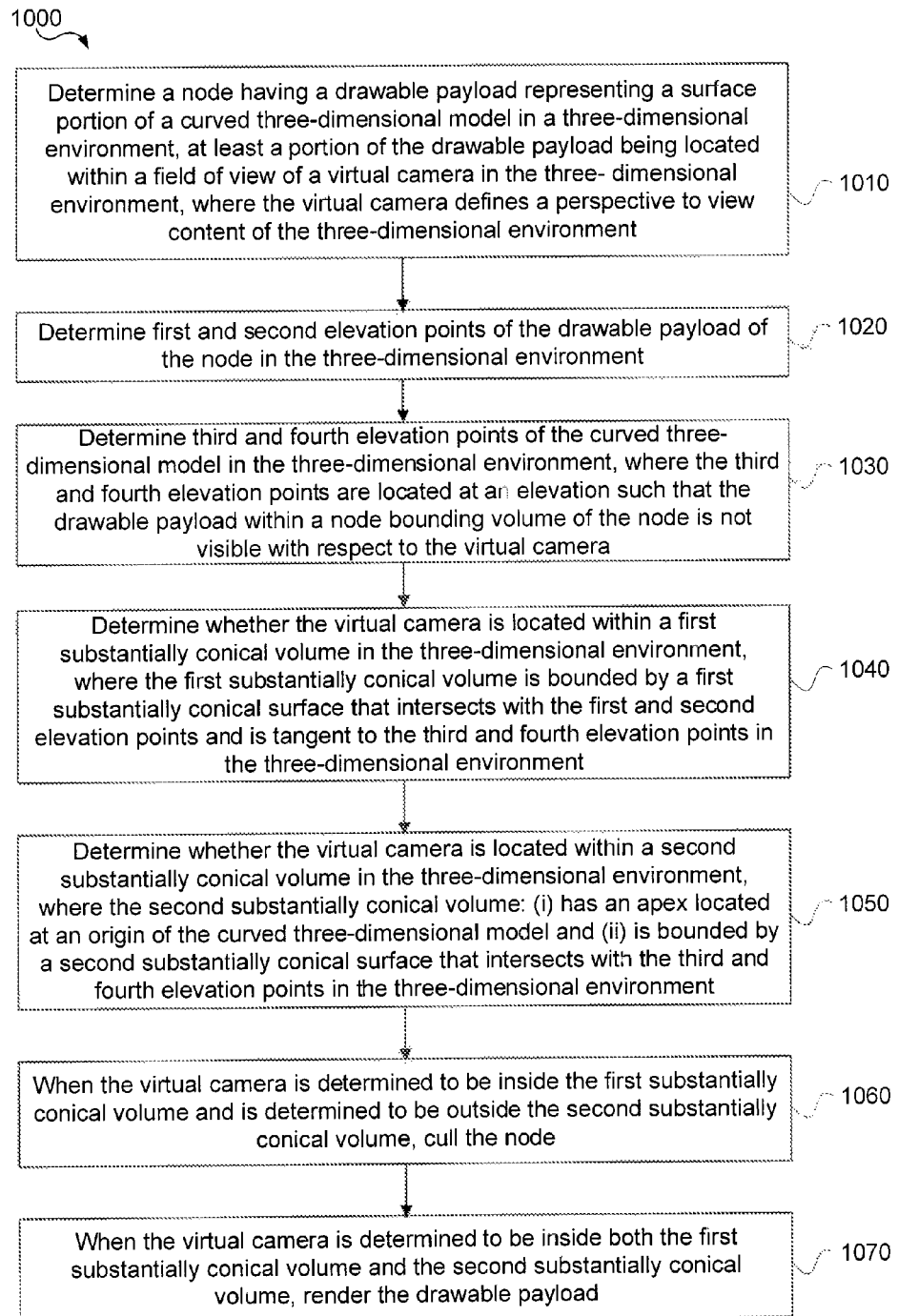
FIG. 10 shows a flowchart of an exemplary method for culling nodes, according to an embodiment.

FIG. 10 shows a flowchart of an exemplary method 1000 for culling nodes, according to an embodiment. Method 1000 may be used in operation of client 900 in FIG. 9. Although method 1000 is described with respect to client 900, it is not meant to be limited to client 900.

At step 1010, a node having a drawable payload representing a surface portion of a curved three-dimensional model in a three-dimensional environment is determined. At least a portion of the drawable payload is located within a field of view of a virtual camera in the three-dimensional environment. A virtual camera defines a perspective to view content of the three-dimensional environment. In an embodiment, node identifier 952 determines a node having a drawable payload representing a surface portion of a curved three-dimensional model in the three-dimensional environment, at least a portion of the drawable payload being located within a field of view of a virtual camera in the three-dimensional environment, where a virtual camera defines a perspective to view content of the three-dimensional environment.

At step 1020, first and second elevation points of the drawable payload of the node in the three-dimensional environment are determined. In an embodiment, point identifier 954 determines first and second elevation points of the drawable payload of the node in the three-dimensional environment.

At step 1030, third and fourth elevation points of the curved three-dimensional model in the three-dimensional environment are determined. The third and fourth elevation points are located at an elevation such that the drawable payload within a node bounding volume of the node is not visible with respect to the virtual camera. In an embodiment, point identifier 954 determines third and fourth elevation points of the curved three-dimensional model in the three-dimensional environment, where the third and fourth elevation points are located at an elevation such that the drawable payload within a node bounding volume of the node is not visible with respect to the virtual camera.

At step 1040, it is determined whether the virtual camera is located within a first substantially conical volume in the three-dimensional environment, where the first substantially conical volume is bounded by a first substantially conical surface that intersects with the first and second elevation points and is tangent to the third and fourth elevation points in the three-dimensional environment. In an embodiment, camera locator 956 determines whether the virtual camera is located within a first substantially conical volume in the three-dimensional environment, where the first substantially conical volume is bounded by a first substantially conical surface that intersects with the first and second elevation points and is tangent to the third and fourth elevation points in the three-dimensional environment.

At step 1050, it is determined whether the virtual camera is located within a second substantially conical volume in the three-dimensional environment, where the second substantially conical volume: (i) has an apex located at an origin of the curved three-dimensional model and (ii) is bounded by a second substantially conical surface that intersects with the third and fourth elevation points in the three-dimensional environment. In an embodiment, camera locator 956 determines whether the virtual camera is located within a second substantially conical volume in the three-dimensional environment, where the second substantially conical volume: (i) has an apex located at an origin of the curved three-dimensional model and (ii) is bounded by a second substantially conical surface that intersects with the third and fourth elevation points in the three-dimensional environment.

At step 1060, when the virtual camera is determined at step 1040 to be inside the first substantially conical volume and is determined at step 1050 to be outside the second substantially conical volume, the node is culled. In an embodiment, when the virtual camera is determined to be inside the first substantially conical volume and is determined to be outside the second substantially conical volume, node culler 958 culls the node. Culling the node may avoid the rendering of drawable data over a horizon of the curved three-dimensional model from the perspective of the virtual camera.

At step 1070, when the virtual camera is determined at step 1040 to be inside both the first substantially conical volume and the second substantially conical volume, the drawable payload is rendered. In an embodiment, when the virtual camera is determined to be inside both the first substantially conical volume and the second substantially conical volume, renderer 959 renders the drawable payload.

Steps 1010-1070 may be performed for each node that is traversed.

V. Node Culling—Ignore Elevation in Node

A. Exemplary Renderer Module

In an embodiment, a renderer module culls nodes and ignores varying elevations in the nodes.

Figure 11:
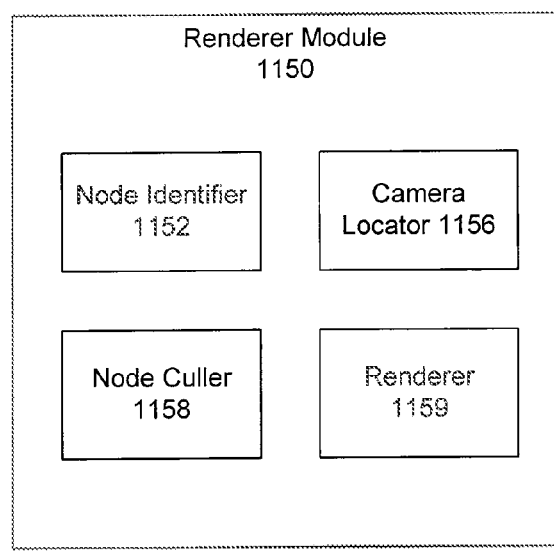
FIG. 11 shows an exemplary renderer module, according to an embodiment.

FIG. 11 shows an exemplary renderer module 1150, according to an embodiment.

Renderer module 1150 uses several sub-modules to cull a node. The sub-modules include a node identifier 1152, camera locator 1156, node culler 1158, and renderer 1159.

Node identifier 952 determines a node having a drawable payload representing a surface portion of a curved three-dimensional model in a three-dimensional environment. At least a portion of the drawable payload is located within a field of view of a virtual camera in the three-dimensional environment. A virtual camera defines a perspective to view content of the three-dimensional environment.

Camera locator 1156 determines whether the virtual camera is located within a first substantially conical volume in the three-dimensional environment, where the first substantially conical volume is bounded by a first substantially conical surface that is tangent to respective vertices of the drawable payload in the three-dimensional model.

Camera locator 1156 also determines whether the virtual camera is located within a second substantially conical volume in the three-dimensional environment, where the second substantially conical volume: (i) has an apex located at an origin of the curved three-dimensional model and (ii) is bounded by a second substantially conical surface that intersects with respective vertices of the drawable payload in the three-dimensional model.

When the virtual camera is determined to be inside the first substantially conical volume and is determined to be outside the second substantially conical volume, node culler 958 culls the node. Culling the node may avoid the rendering of drawable data over a horizon of the curved three-dimensional model from the perspective of the virtual camera.

When the virtual camera is determined to be inside both the first substantially conical volume and the second substantially conical volume, renderer 959 renders the drawable payload.

B. Exemplary Method

Figure 12:
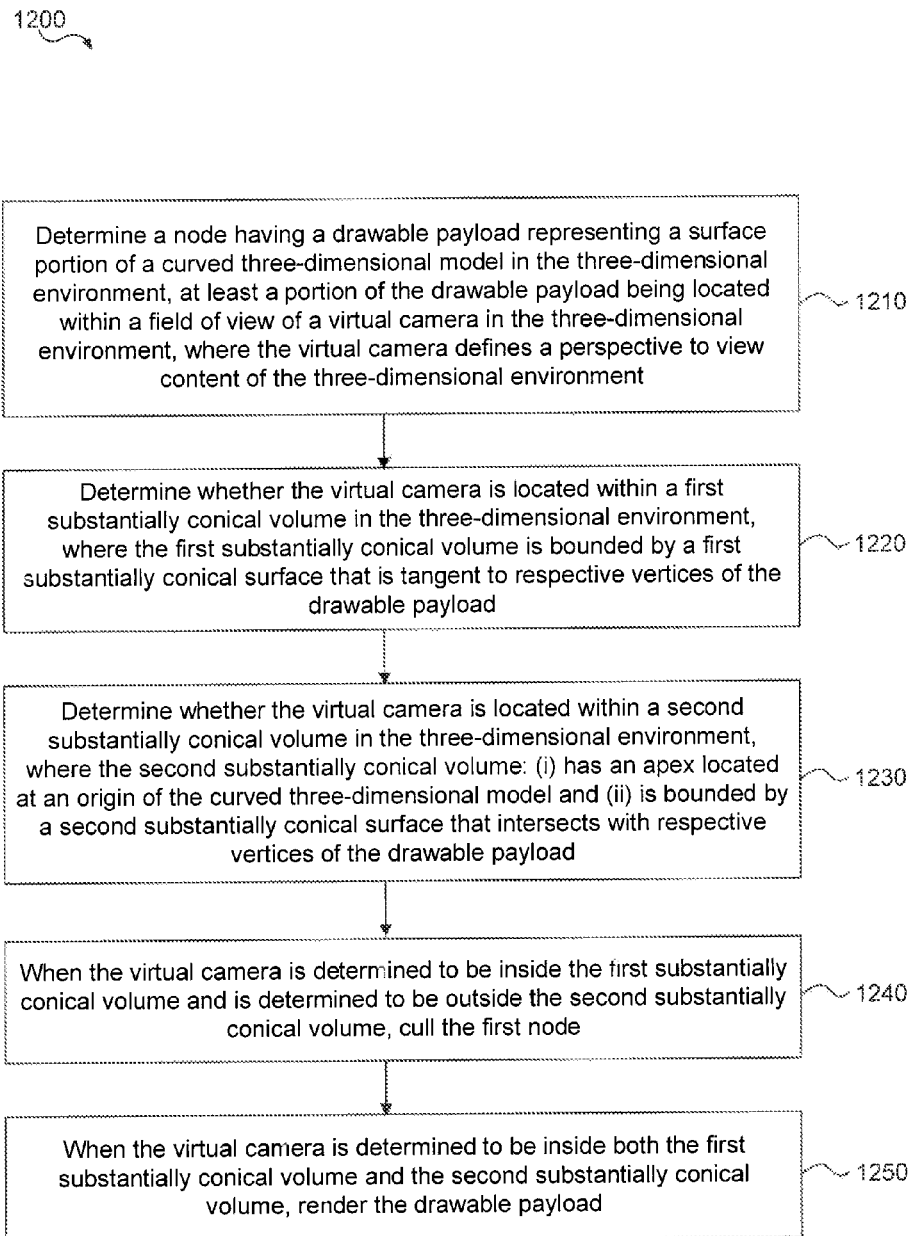
FIG. 12 shows a flowchart of an exemplary method for culling nodes, according to an embodiment.

FIG. 12 shows a flowchart of an exemplary method 1200 for culling nodes, according to an embodiment. Method 1200 may be used in operation of client 1100 in FIG. 11. Although method 1200 is described with respect to client 1100, it is not meant to be limited to client 1100.

At step 1210, a node having a drawable payload representing a surface portion of a curved three-dimensional model in a three-dimensional environment is determined. At least a portion of the drawable payload is located within a field of view of a virtual camera in the three-dimensional environment. The virtual camera defines a perspective to view content of the three-dimensional environment.

At step 1220, it is determined whether the virtual camera is located within a first substantially conical volume in the three-dimensional environment, where the first substantially conical volume is bounded by a first substantially conical surface that is tangent to respective vertices of the drawable payload in the three-dimensional model.

At step 1230, it is determined whether the virtual camera is located within a second substantially conical volume in the three-dimensional environment, where the second substantially conical volume: (i) has an apex located at an origin of the curved three-dimensional model and (ii) is bounded by a second substantially conical surface that intersects with respective vertices of the drawable payload in the three-dimensional model.

At step 1240, when the virtual camera is determined at step 1220 to be inside the first substantially conical volume and is determined at step 1230 to be outside the second substantially conical volume, the node is culled. Culling the node avoids the rendering of drawable data over a horizon of the curved three-dimensional model from the perspective of the virtual camera.

At step 1250, when the virtual camera is determined at step 1220 to be inside both the first substantially conical volume and the second substantially conical volume, the drawable payload is rendered.

Steps 1210-1250 may be performed for each node that is traversed.

VI. Conclusion

It is to be appreciated that the Detailed Description section, and not the Summary and Abstract sections, is intended to be used to interpret the claims. The Summary and Abstract sections may set forth one or more but not all exemplary embodiments, and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A computer-implemented method for culling nodes for rendering a three-dimensional environment, comprising:
   (a) determining a node having a drawable payload representing a surface portion of a curved three-dimensional model in the three-dimensional environment, at least a portion of the drawable payload being located within a field of view of a virtual camera in the three-dimensional environment, wherein the virtual camera defines a perspective to view content of the three-dimensional environment;
   (b) determining whether the virtual camera is located within a first substantially conical volume in the three-dimensional environment, wherein the first substantially conical volume is bounded by a first substantially conical surface that is tangent to respective vertices of the drawable payload in the three-dimensional model;
   (c) determining whether the virtual camera is located within a second substantially conical volume in the three-dimensional environment, wherein the second substantially conical volume: (i) has an apex located at an origin of the curved three-dimensional model and (ii) is bounded by a second substantially conical surface that intersects with respective vertices of the drawable payload in the three-dimensional model;

(d) when the virtual camera is determined in (b) to be inside the first substantially conical volume and is determined in (c) to be outside the second substantially conical volume, culling the node; and (e) when the virtual camera is determined in (b) to be inside both the first substantially conical volume and the second substantially conical volume, rendering the drawable payload, whereby the culling (d) avoids the rendering of drawable data over a horizon of the curved three-dimensional model from the perspective of the virtual camera.

2. The method of claim 1, wherein the culling (d) occurs when the virtual camera is located below an altitude of an apex of the first substantially conical surface.

3. The method of claim 1, wherein the rendering (e) occurs when the virtual camera is located between an altitude of an apex of the first substantially conical surface and a surface of the curved three-dimensional model.

4. The method of claim 1, wherein the curved three-dimensional model has a substantially spherical volume.

5. The method of claim 1, wherein the curved three-dimensional model in the three-dimensional environment is a three-dimensional model of the Earth.

6. A system for culling nodes for rendering a three-dimensional environment, comprising:

a node identifier implemented by one or more processors, the node identifier being configured to determine a node having a drawable payload representing a surface portion of a curved three-dimensional model in the three-dimensional environment, at least a portion of the drawable payload being located within a field of view of a virtual camera in the three-dimensional environment, wherein the virtual camera defines a perspective to view content of the three-dimensional environment;

a camera locator implemented by the one or more processors, the camera locator being configured to (i) determine whether the virtual camera is located within first substantially conical volume in the three-dimensional environment, wherein the first substantially conical volume is bounded by a first substantially conical surface that is tangent to respective vertices of the drawable payload in the three-dimensional model, and (ii) determine whether the virtual camera is located within a second substantially conical volume in the three-dimensional environment, wherein the second substantially conical volume: (i) has an apex located at an origin of the curved three-dimensional model and (ii) is bounded by a second substantially conical surface that intersects with respective vertices of the drawable payload in the three-dimensional model;

a node culler implemented by the one or more processors, the node culler being configured to, when the virtual camera is determined to be inside the first substantially conical volume and is determined to be outside the second substantially conical volume, cull the node; and a renderer implemented by the one or more processors, the renderer being configured to, when the virtual camera is determined to be inside both the first substantially conical volume and the second substantially conical volume, render the drawable payload, whereby the node culler avoids the rendering of drawable data over a horizon of the curved three-dimensional model from the perspective of the virtual camera.

7. The system of claim 6, wherein the node culler is configured to cull the node when the virtual camera is located below an altitude of an apex of the first substantially conical surface.

8. The system of claim 6, wherein the renderer is configured to render the drawable payload when the virtual camera is located between an altitude of an apex of the first substantially conical surface and a surface of the curved three-dimensional model.

9. An apparatus comprising at least one non-transitory computer readable storage medium encoding instructions thereon that, in response to execution by a computing device, cause the computing device to perform operations comprising:

(a) determining a node having a drawable payload representing a surface portion of a curved three-dimensional model in the three-dimensional environment, at least a portion of the drawable payload being located within a field of view of a virtual camera in the three-dimensional environment, wherein the virtual camera defines a perspective to view content of the three-dimensional environment;

(b) determining whether the virtual camera is located within a first substantially conical volume in the three-dimensional environment, wherein the first substantially conical volume is bounded by a first substantially conical surface that is tangent to respective vertices of the drawable payload in the three-dimensional model;

(c) determining whether the virtual camera is located within a second substantially conical volume in the three-dimensional environment, wherein the second substantially conical volume: (i) has an apex located at an origin of the curved three-dimensional model and (ii) is bounded by a second substantially conical surface that intersects with respective vertices of the drawable payload in the three-dimensional model;

(d) when the virtual camera is determined in (b) to be inside the first substantially conical volume and is determined in (c) to be outside the second substantially conical volume, culling the node; and (e) when the virtual camera is determined in (b) to be inside both the first substantially conical volume and the second substantially conical volume, rendering the drawable payload, whereby the culling (d) avoids the rendering of drawable data over a horizon of the curved three-dimensional model from the perspective of the virtual camera.

10. The apparatus of claim 9, wherein the culling (d) occurs when the virtual camera is located below an altitude of an apex of the first substantially conical surface.

11. The apparatus of claim 9, wherein the rendering (e) occurs when the virtual camera is located between an altitude of an apex of the first substantially conical surface and a surface of the curved three-dimensional model.

12. A computer-implemented method for culling nodes for rendering a three-dimensional environment, comprising:

(a) determining a node having a drawable payload representing a surface portion of a curved three-dimensional model in the three-dimensional environment, at least a portion of the drawable payload being located within a field of view of a virtual camera in the three-dimensional environment, wherein the virtual camera defines a perspective to view content of the three-dimensional environment;

(b) determining first and second elevation points of the drawable payload of the node in the three-dimensional environment;

(c) determining third and fourth elevation points of the curved three-dimensional model in the three-dimensional environment, wherein the third and fourth elevation points are located at an elevation such that the drawable payload within a node bounding volume of the node is not visible with respect to the virtual camera;

(d) determining whether the virtual camera is located within a first substantially conical volume in the three-dimensional environment, wherein the first substantially conical volume is bounded by a first substantially conical surface that intersects with the first and second elevation points and is tangent to the third and fourth elevation points in the three-dimensional environment;

(e) determining whether the virtual camera is located within a second substantially conical volume in the three-dimensional environment, wherein the second substantially conical volume: (i) has an apex located at an origin of the curved three-dimensional model and (ii) is bounded by a second substantially conical surface that intersects with the third and fourth elevation points in the three-dimensional environment;

(f) when the virtual camera is determined in (d) to be inside both the first substantially conical volume and is determined in (c) to be outside the second substantially conical volume, culling the node; and (g) when the virtual camera is determined in (d) to be inside both the first substantially conical volume and the second substantially conical volume, rendering the drawable payload, whereby the culling (f) avoids the rendering of drawable data over a horizon of the curved three-dimensional model from the perspective of the virtual camera.

13. The method of claim 12, wherein the first and second elevation points are located at an elevation corresponding to a highest elevation point of a bounding volume of the drawable payload.

14. The method of claim 12, wherein the culling (1) occurs when the virtual camera is located below an altitude of an apex of the first substantially conical surface.

15. The method of claim 12, wherein the curved three-dimensional model has a substantially spherical volume.

16. A system for culling nodes for rendering a three-dimensional environment, comprising:

a node identifier implemented by one or more processors, the node identifier being configured to determine a node having a drawable payload representing a surface portion of a curved three-dimensional model in the three-dimensional environment, at least a portion of the drawable payload being located within a field of view of a virtual camera in the three-dimensional environment, wherein the virtual camera defines a perspective to view content of the three-dimensional environment;

an point identifier implemented by the one or more processors, the point identifier being configured to: (i) determine first and second elevation points of the drawable payload of the node in the three-dimensional environment and (ii) determine third and fourth elevation points of the curved three-dimensional model in the three-dimensional environment, wherein the third and fourth elevation points are located at an elevation such that the drawable payload within a node hounding volume of the node is not visible with respect to the virtual camera;

a camera locator implemented by the one or more processors, the camera locator being configured to (i) determine whether the virtual camera is located within a first substantially conical volume in the three-dimensional environment, wherein the first substantially conical volume is bounded by a first substantially conical surface that intersects with the first and second elevation points and is tangent to the third and fourth elevation points in the three-dimensional environment;

(ii) determine whether the virtual camera is located within a second substantially conical volume in the three-dimensional environment, wherein the second substantially conical volume: (i) has an apex located at an origin of the curved three-dimensional model and (ii) is hounded by a second substantially conical surface that intersects with the third and fourth elevation points in the three-dimensional environment;

a node culler implemented by the one or more processors, the node culler being configured to, when the virtual camera is determined to be inside the first substantially conical volume and is determined to be outside the second substantially conical volume, cull the node; and a renderer implemented by the one or more processors, the renderer being configured to, when the virtual camera is determined to be inside both the first substantially conical volume and the second substantially conical volume, render the drawable payload, whereby the node culler avoids the rendering of drawable data over a horizon of the curved three-dimensional model from the perspective of the virtual camera.

17. The system of claim 16, wherein the first and second elevation points are located at an elevation corresponding to a highest elevation point of a bounding volume of the drawable payload.

18. The system of claim 16, wherein the node culler is configured to cull the node when the virtual camera is located below an altitude of an apex of the first substantially conical surface.

19. An apparatus comprising at least one non-transitory computer readable storage medium encoding instructions thereon that, in response to execution by a computing device, cause the computing device to perform operations comprising:

(a) determining a node having a drawable payload representing a surface portion of a curved three-dimensional model in the three-dimensional environment at least a portion of the drawable payload being located within a field of view of a virtual camera in the three-dimensional environment, wherein the virtual camera defines a perspective to view content of the three-dimensional environment;

(b) determining first and second elevation points of the drawable payload of the node in the three-dimensional environment;

(c) determining third and fourth elevation points of the curved three-dimensional model in the three-dimensional environment, wherein the third and fourth elevation points are located at an elevation such that the drawable payload within a node bounding volume of the node is not visible with respect to the virtual camera;

(d) determining whether the virtual camera is located within a first substantially conical volume in the three-dimensional environment, wherein the first substantially conical volume is bounded by a first substantially conical surface that intersects with the first and second elevation points and is tangent to the third and fourth elevation points in the three-dimensional environment;

(e) determining whether the virtual camera is located within a second substantially conical volume in the three-dimensional environment, wherein the second substantially conical volume: (i) has an apex located at an origin of the curved three-dimensional model and (ii) is bounded by a second substantially conical surface that intersects with the third and fourth elevation points in the three-dimensional environment;

(f) when the virtual camera is determined in (d) to be inside the first substantially conical volume and is determined in (e) to be outside the second substantially conical volume, culling the node; and (g) when the virtual camera is determined in (d) to be inside both the first substantially conical volume and the second substantially conical volume, rendering the drawable payload, whereby the culling (f) avoids the rendering of drawable data over a horizon of the curved three-dimensional model from the perspective of the virtual camera.

20. The apparatus of claim 19, wherein the culling (f) occurs when the virtual camera is located below an altitude of an apex of the first substantially conical surface.

* * * * *

UNITED STATES PATENT AND TRADEMARK OFFICE
CERTIFICATE OF CORRECTION

PATENT NO.      : 8,767,011 B1
APPLICATION NO. : 13/274933
DATED           : July 1, 2014
INVENTOR(S)     : Kornmann Page 1 of 1

It is certified that error appears in the above-identified patent and that said Letters Patent is hereby corrected as shown below:

In the claims

Column 21, Line 27, after word "in", please delete "(c)" and insert --(e)--

Column 21, Line 40, after word "culling", please delete "(1)" and insert --(f)--

Column 21, Line 64, after word "node", please delete "hounding" and insert --bounding--

Column 22, Line 15, after word "is", please delete "hounding" and insert --bounding--

Signed and Sealed this
Second Day of August, 2016

Michelle K. Lee
*Director of the United States Patent and Trademark Office*